United States Patent
Greider

[15] 3,672,001
[45] June 27, 1972

[54] PRODUCT ENCASING MACHINE

[72] Inventor: Charles Austin Greider, Des Moines, Iowa

[73] Assignee: Townsend Engineering Company, Des Moines, Iowa

[22] Filed: June 29, 1970

[21] Appl. No.: 50,740

[52] U.S. Cl. ..................................................................17/33
[51] Int. Cl. .....................................A22c 11/02, A22c 11/10
[58] Field of Search .........................................17/33, 34, 48

[56] References Cited

UNITED STATES PATENTS

| | | | |
|---|---|---|---|
| 3,191,222 | 6/1965 | Townsend | 17/33 |
| 3,115,668 | 12/1963 | Townsend | 17/33 |

*Primary Examiner*—Lucie H. Laudenslager
*Attorney*—Zarley, McKee & Thomte

[57] ABSTRACT

A product encasing machine comprising an adjustable hopper for product casings, the hopper being positioned above a clamp means comprising front and rear V-shaped seats. The front and rear seats are adapted to receive one casing at a time from the hopper when in their open position. The front and rear seats are movable from the open position to a closed position so as to grasp the casing therebetween and position the same so as to permit a stuffer tube to be inserted therein. The stuffer tube slidably extends through and is in communication with a meat pump to permit the stuffer tube to inject the meat product into the casing. The clamp seats return to their open position after the stuffer tube has been inserted into the casing. The machine includes a linking assembly which links the product into uniform links. A looping assembly automatically deposits the links in uniform loops on a take-away conveyor. A cam follower rod is slidably mounted below the stuffer tube and has a casing follower mounted thereon which moves along the stuffer tube and engages one end of the casing to compress the casing before it is rotated and to maintain uniform pressure on the casing as the meat product is encased in the casing. A counterbalanced arm member extends through the front clamp seat and prevents the closing movement thereof to prevent recycling of the machine unless a casing is positioned thereon. Means is provided to prevent damage to the fragile casings as they are being handled by the machine. Means is also provided for precisely controlling the operation of the stuffer tube, cam follower rod and casing clamp so that the machine properly cycles to automatically produce a uniformly encased product.

19 Claims, 18 Drawing Figures

PATENTED JUN 27 1972

INVENTOR
CHARLES AUSTIN GREIDER
BY
Zarley, McKee & Thomte
ATTORNEYS

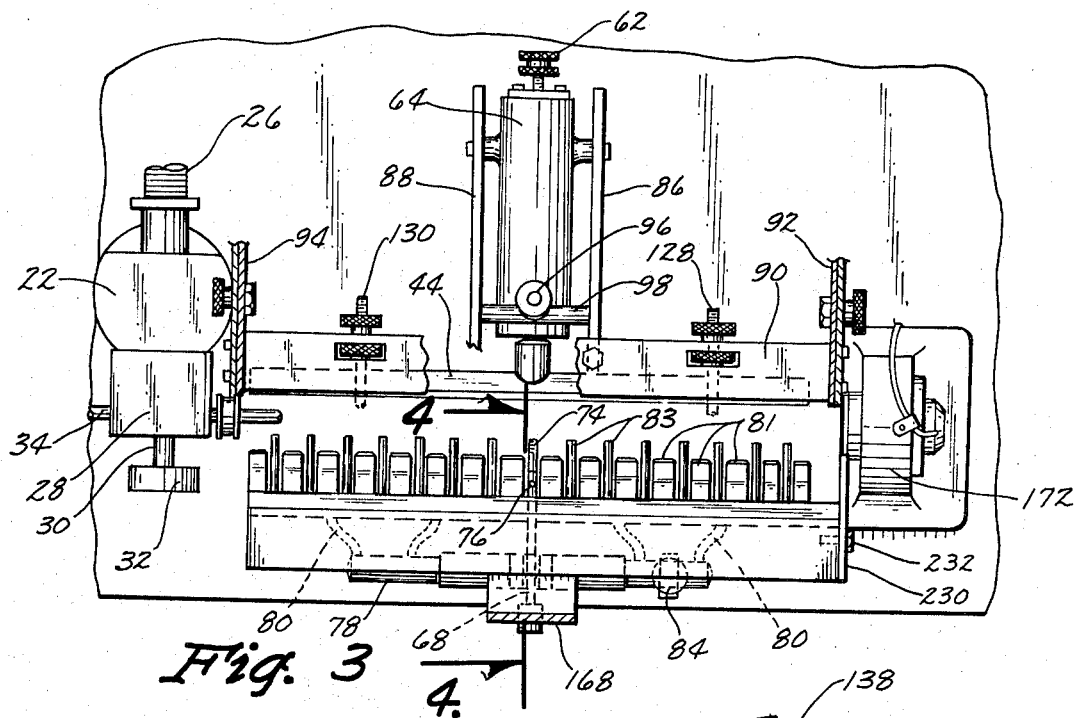
Fig. 3
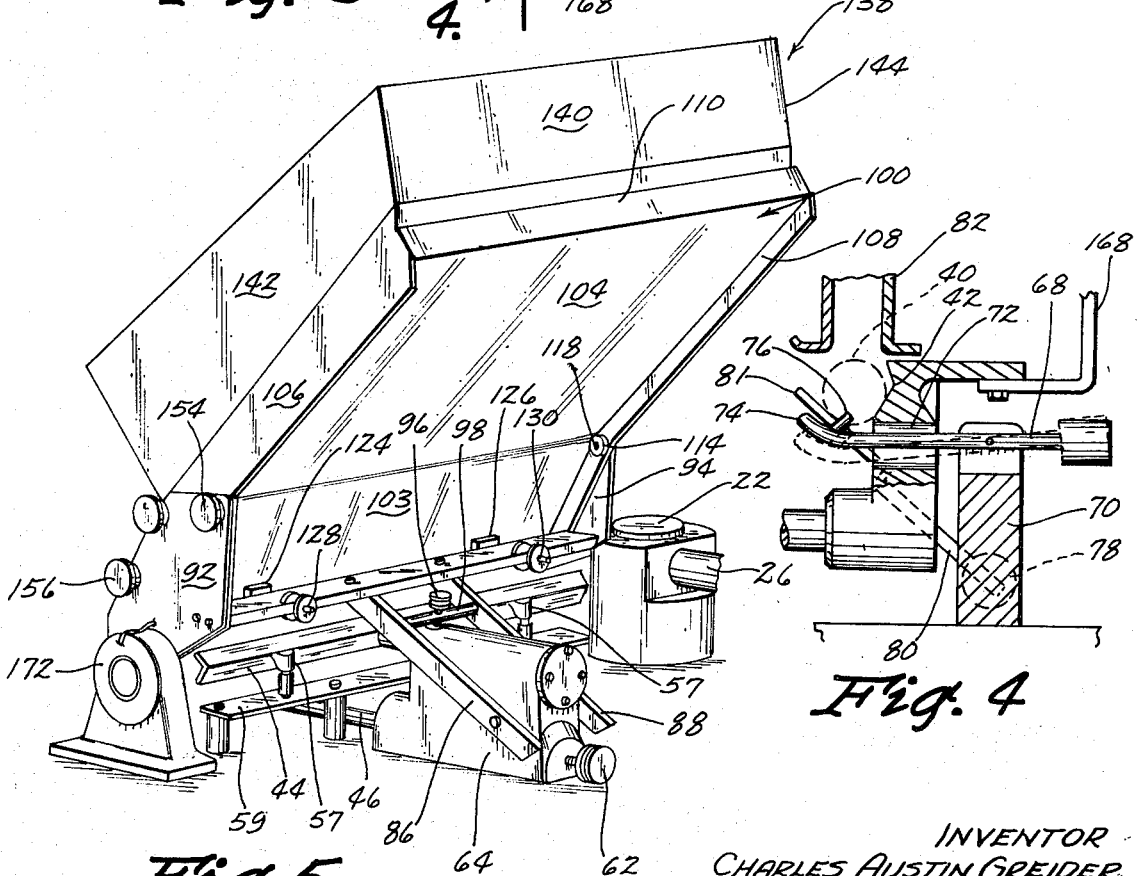
Fig. 4
Fig. 5
INVENTOR
CHARLES AUSTIN GREIDER
BY
Zarley, McKee & Thomte
ATTORNEYS

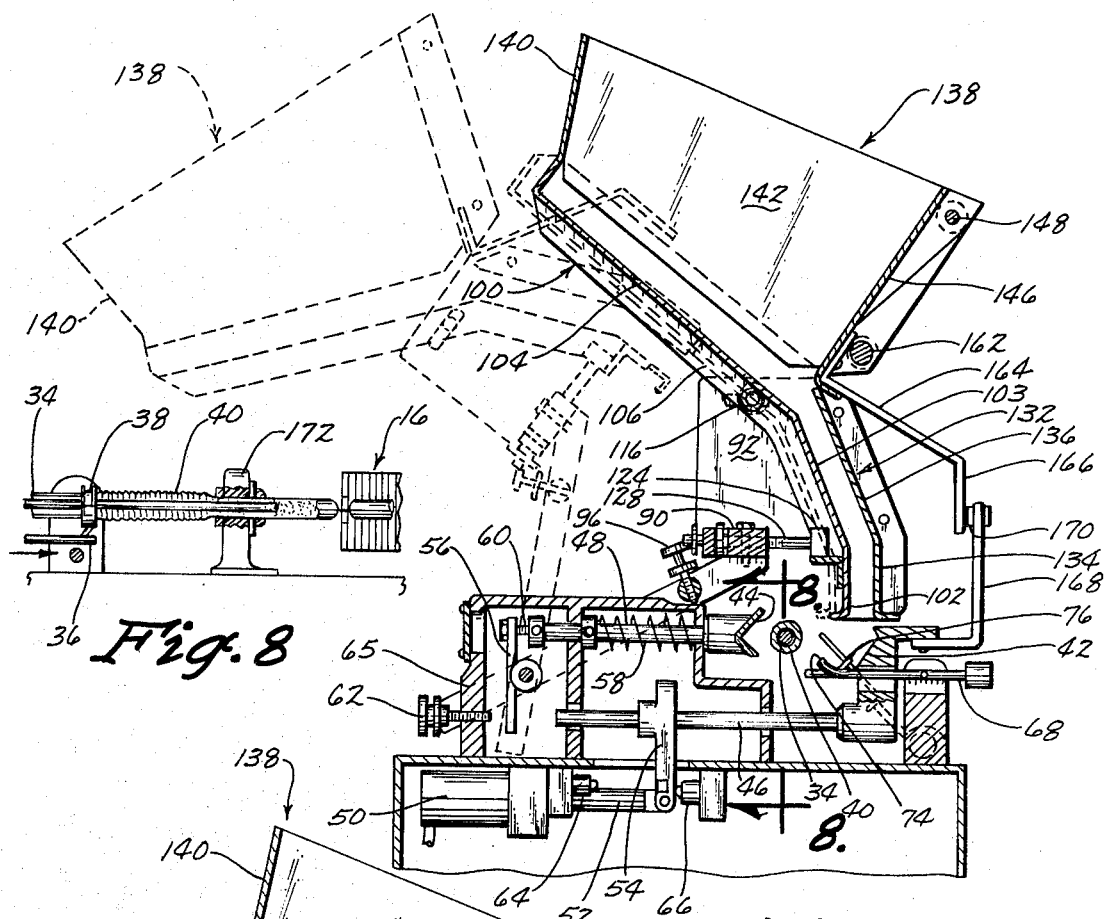
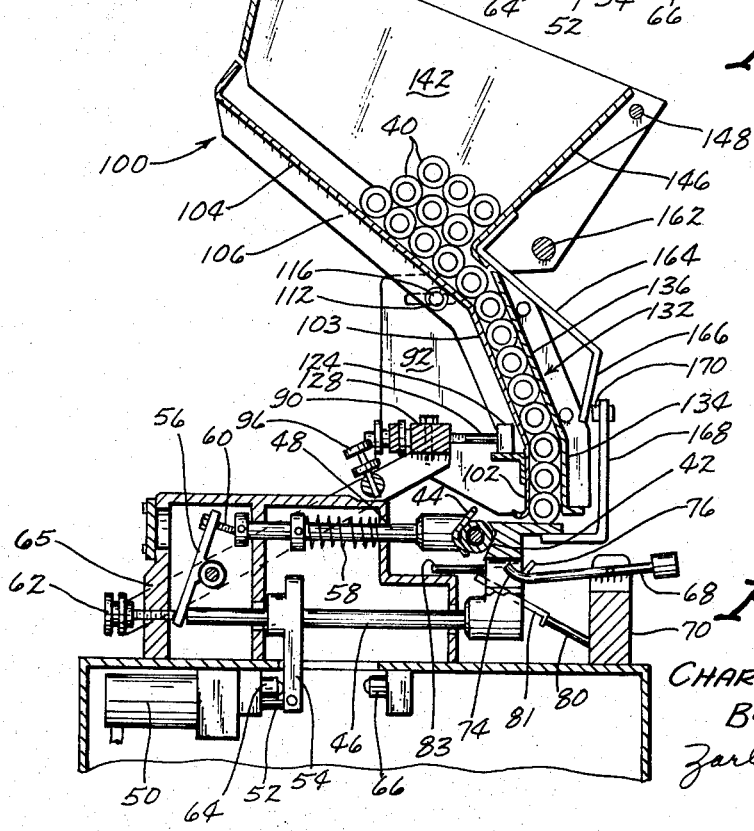
Fig. 8
Fig. 6
Fig. 7
INVENTOR
CHARLES AUSTIN GREIDER
BY
Zarley, McKee & Thomte
ATTORNEYS

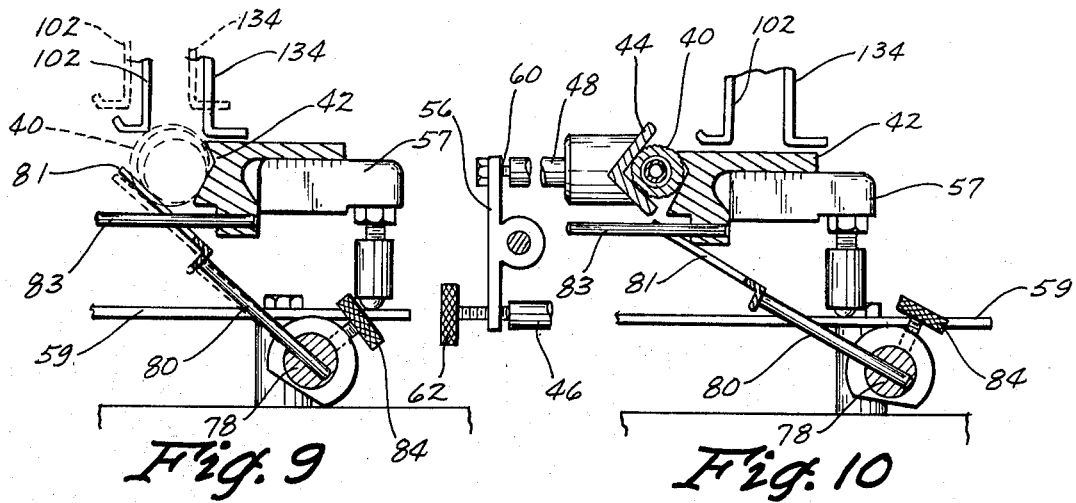
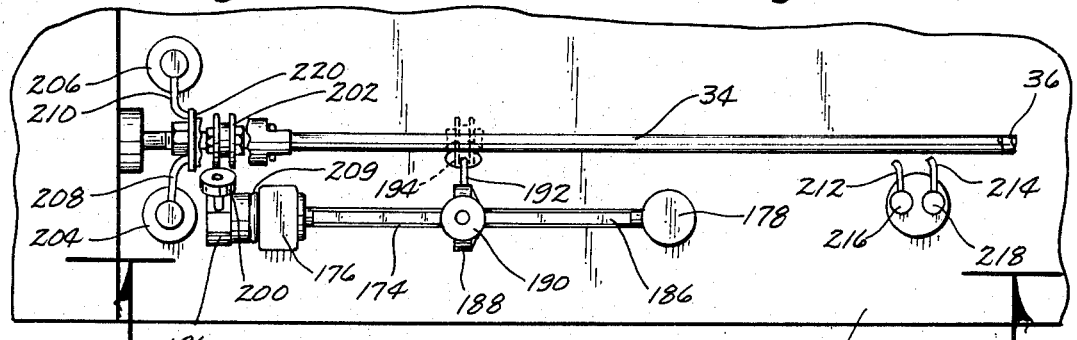
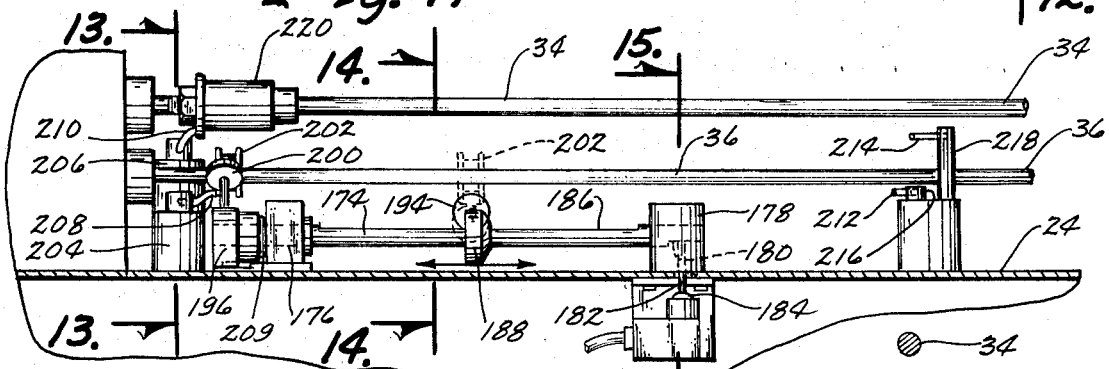
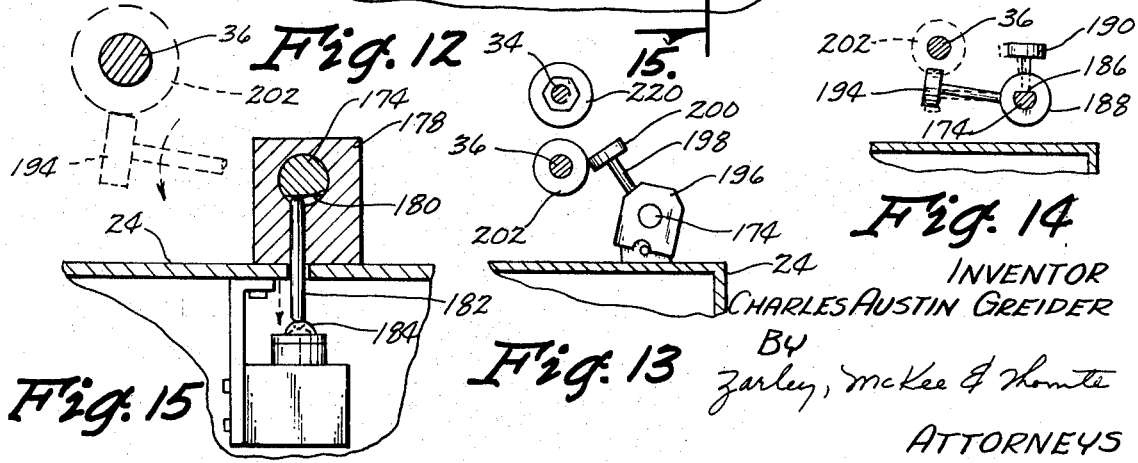
INVENTOR
CHARLES AUSTIN GREIDER
BY
Zarley, McKee & Thomte
ATTORNEYS INVENTOR
CHARLES AUSTIN GREIDER
BY
Zarley, McKee & Thomte
ATTORNEYS

PRODUCT ENCASING MACHINE

This invention relates to certain improvements in the machine disclosed in U.S. Pat. No. 3,191,222 which issued on June 29, 1965.

While the machine disclosed in said patent has been generally satisfactory, it has been necessary to devise a machine which handles the fragile collagen casings in a more sensitive manner so as to prevent damage thereto. If the casing becomes damaged, an inferior encased product results. Further, the casing sizes vary considerably and the patented machine simply does not accommodate various casing sizes in a convenient manner.

Therefore, it is the principal object of this invention to provide a product encasing machine for frankfurters, sausage or the like.

A further object of this invention is to provide an improved product encasing machine.

A further object of this invention is to provide an improved product encasing machine which prevents damage to the sensitive collagen casings.

A further object of this invention is to provide a product encasing machine which includes means to prevent the operation of the machine if a casing is not available.

A further object of this invention is to provide a product encasing machine having a casing hopper provided thereon which is adjustable to accommodate various casing sizes.

A further object of this invention is to provide a product encasing machine which has means thereon to exert a uniform pressure on the casing as the product is being inserted thereinto.

A further object of this invention is to provide a product encasing machine which is automatic in operation.

A further object of this invention is to provide a product encasing machine which is economical to manufacture, durable in use and refined in appearance.

These and other objects will be apparent to those skilled in the art.

This invention consists in the construction, arrangements and combination of the various parts of the device, whereby the objects contemplated are attained as hereinafter more fully set forth, specifically pointed out in the claims, and illustrated in the accompanying drawings in which:

FIG. 3 is a sectional view as seen along line 3—3 of FIG. 2 with portions thereof cut away to more fully illustrate the invention;

FIG. 4 is an enlarged sectional view as seen along line 4—4 of FIG. 3;

FIG. 5 is a rear perspective view of the casing hopper and its supporting structure;

FIG. 6 is a sectional view as seen along line 6—6 of FIG. 2, the broken lines indicating the pivotal movement of the casing hopper;

FIG. 7 is a view similar to FIG. 6 except that the casing clamp has been moved to a closed position;

FIG. 8 is a sectional view as seen along line 8—8 of FIG. 6;

FIG. 9 is a sectional view as seen along line 9—9 of FIG. 2;

FIG. 10 is a view similar to FIG. 9 except that the casing clamp has been moved to a closed position;

FIG. 11 is a partial top view as seen along line 11—11 of FIG. 1;

FIG. 12 is a sectional view seen along line 12—12 of FIG. 11;

FIG. 13 is a sectional view seen along line 13—13 of FIG. 12;

FIG. 14 is a sectional view seen along line 14—14 of FIG. 12; and

FIG. 15 is a sectional view seen along line 15—15 of FIG. 12.

Figure 1:
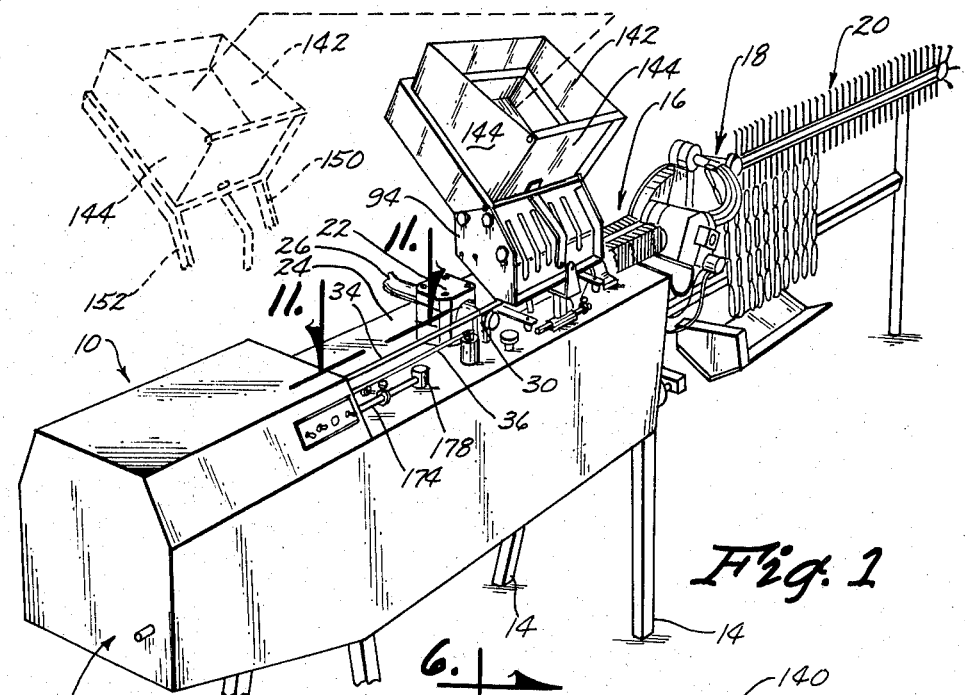
FIG. 1 is a partial front perspective view of the machine of this invention, the broken lines illustrating the removable feature of the auxiliary hopper.

In FIG. 1, the numeral 10 refers to the machine for encasing products such as sausages, frankfurters, etc., the machine being automatically operable through complete cycles of operation. Machine 10 generally comprises a housing 12 supported by legs 14. A linking assembly 16 is provided at one end of the machine adapted to link the encased product as disclosed in U.S. Pat. No. 3,191,222. The numeral 18 refers generally to a looping assembly which automatically deposits the linked product in uniform loops on the take-away conveyor 20. The looping assembly 18 and conveyor 20 are described in detail in U.S. Pat. No. 3,191,222 and that description is relied on herein.

A meat mixture pump 22 is mounted on top 24 of housing 12 and has a meat conduit 26 extending therefrom which is in communication with a source of meat. An outlet housing 28 is held in contact with the pump 22 by means of a set screw 30 having a knob 32 thereon. This arrangement facilitates removal of the housing 28 for cleaning purposes. The housing 28 has a bore extending therethrough which slidably receives a stuffer tube 34. The stuffer tube 34 has ports formed therein adjacent its left end as viewed in FIG. 1 to facilitate the pumping of meat therein at a predetermined time. The movement of stuffer tube 34 is controlled by an air cylinder (not shown) for reciprocating the stuffer tube in a horizontal manner.

A second air cylinder is also provided (not shown) which reciprocates a cam follower rod 36 on which a casing follower 38 is mounted. Stuffer tube 34 slidably extends through follower 38, the follower being adapted to engage the end of the collagen casing 40 as will be described hereinafter.

Casings 40 are manufactured from collagen which is a connective tissue protein found in organ and by-product meats. When collagen is heated, it breaks down to form a gelatin. Hence, the name "collagen" casings. The casings are edible and are not peeled off as in the "skinless" frankfurters. The casings are very fragile and are easily torn in their fresh, usable state.

A casing clamp comprising a V-shaped front seat 42 and a V-shaped back seat 44 is aligned with the stuffer tube 34 for receiving one of the casings 40 therein. The front seat 42 is mounted on a slide rod 46 and the back seat 44 is mounted on a slide rod 48 as seen in FIG. 7. The seats 42 and 44 are adapted to move alternately to the open position shown in FIG. 6 and the closed position shown in FIG. 7. To accomplish such movement, the front seat 42 is reciprocated by an air cylinder 50 having its piston rod 52 operatively connected to the bracket 54 which is rigidly secured to the slide rod 46. The movement of front seat 42 to the closed position of FIG. 7 causes slide rod 48 to move back seat 44 to the closed position through rock lever 56 against the resistance of spring 58. Back seat 44 is provided with a pair of downwardly extending adjustable guides 57 which move on guide plate 59 to maintain back seat 44 in a horizontal position. The adjustable guides 57 also permit the vertical adjustment of the seat 44 with respect to the front seat 42 and with respect to the hopper positioned thereabove. As seen in FIG. 7, rock lever 56 includes an adjustment bolt 60 which engages the end of slide rod 48 to permit the adjustment of the positioning of the back seat 44 to compensate for various casing sizes. An adjustment screw 62 threadably extends through the housing 63 and is adapted to adjustably limit the pivotal movement of rock lever 56 to provide an adjustment means in addition to the bolt 60. Spring 58 causes slide rod 48 and hence back seat 44 to move to the open position when air cylinder 50 moves front seat 42 to the open position seen in FIG. 6. Limit switches 64 and 66 are provided as seen in FIGS. 6 and 7 and are adapted to be actuated by the bracket 54 at the extreme positions of the piston rod 52.

A counterbalanced sensing arm 68 is pivotally mounted on support 70 and extends through slot 72 formed in front seat 42. As illustrated in FIG. 4, arm 68 includes an upwardly extending arcuate end portion 74 having a hook 76 extending upwardly and forwardly therefrom. With front seat 42 in the open position as shown in FIG. 4 and the casing 40 not being positioned adjacent thereto, the hook 76 will engage front seat 42 and will prevent the front seat 42 from moving to the closed position. When a casing 40 is adjacent the front seat 42 as shown in broken lines in FIG. 4, the weight of the casing causes arm 68 to pivot to the position shown in broken lines so that the hook 76 will not engage the front seat 42 as front seat 42 moves to the closed position but will pass through the slot 72.

A spring biased horizontal shaft 78 extends through support 70 and has a plurality of fingers 80 extending upwardly therefrom. A plurality of retaining fingers 81 extend upwardly from the upper ends of the fingers 80 and are adapted to prevent more than one casing 40 from dropping from the hopper 82. Shaft 78 has an adjustable collar 84 mounted thereon which may be selectively rotated with respect to the shaft to achieve the desired biasing of the fingers 80. Front seat 42 is provided with a plurality of spaced apart rods 83 which extend horizontally rearwardly therefrom between each of the fingers 81 as illustrated in FIG. 3.

A pair of arms 86 and 88 are pivoted at their lower ends to the opposite sides of housing 65 and extend upwardly and forwardly therefrom. Brace 90 is secured to the upper ends of arms 86 and 88 by bolts or the like and extends horizontally outwardly therefrom. Plates 92 and 94 are secured by screws or the like to the opposite ends of brace 90. An adjustment screw 96 extends through a support member 98 extending between arms 86 and 88 and is adapted to engage the housing 65 to permit the adjustable positioning of arms 86 and 88 with respect thereto.

The reference numeral 100 refers generally to a casing hopper comprising a lower back wall member 102, intermediate back wall member 103, upper back wall member 104, sides 106 and 108, and upper end 110. Internally threaded collars 112 and 114 are secured to sides 106 and 108 respectively as shown in FIGS. 5 and 7. Plates 92 and 94 have horizontal slots formed therein adjacent their upper ends which receive bolts 116 and 118 extending therethrough respectively which are threaded into collars 112 and 114 respectively to permit the horizontal adjustment of the back wall portion of the casing hopper with respect to plates 92 and 94.

Angle brackets 120 and 122 (not shown) are secured to lower back wall member 102 in a horizontal spaced relationship and have internally threaded block members 124 and 126 secured thereto respectively. Bolts 128 and 130 are secured to block members 124 and 126 respectively and extend rearwardly through bores formed in brace 90. Each of the bolts 128 and 130 have a pair of threaded adjustment knobs mounted thereon as shown in FIG. 5 to permit the selective adjustment of the back wall portion of the casing hopper 100. Casing hopper 100 also includes a slotted front wall member 132 which is secured to and extends between plates 92 and 94. Front wall member 132 generally comprises a lower wall member 134 and an upper wall member 136 which are positioned forwardly of wall members 102 and 103 respectively.

The numeral 138 refers to an auxiliary hopper which may be used in addition to hopper 100 to provide a greater casing capacity and to provide a means for agitating the casings in the hopper if so desired. Hopper 138 comprises a back wall 140, sides 142 and 144 and a front wall 146 which is pivotally connected at its upper end to sides 142 and 144 by means of rod 148. Auxiliary hopper 138 is supported on the hopper 110 by means of legs 150 and 152 which extend downwardly from sides 142 and 144 respectively and which are detachably secured to plates 92 and 94 by thumbscrews 154, 156 and 158, 160 respectively. Rod 162 is secured to and extends between sides 142 and 144 forwardly of front wall 146 to limit the pivotal movement thereof in one direction. Arm 164 is secured to front wall 146 and is engaged at its lower end 166 by an upstanding arm 168 which is secured to front seat 42 for movement therewith. Thus, when auxiliary hopper 138 is being used on the machine, the movement of the front seat 42 to its closed position causes arm 168 to engage arm 164 to pivot the front wall 146 to agitate the casings in the hopper to insure that the casings will not "bridge" or otherwise stick in the hopper. An adjustment bolt 170 extends through the upper end of arm 168 to provide a means for selectively adjusting the amount of movement of front wall 146. FIG. 6 illustrates the fact that the hopper 100 may be pivoted from the position shown by solid lines to the position shown by broken lines to facilitate cleaning, adjustment and repair of the machine.

Figure 2:
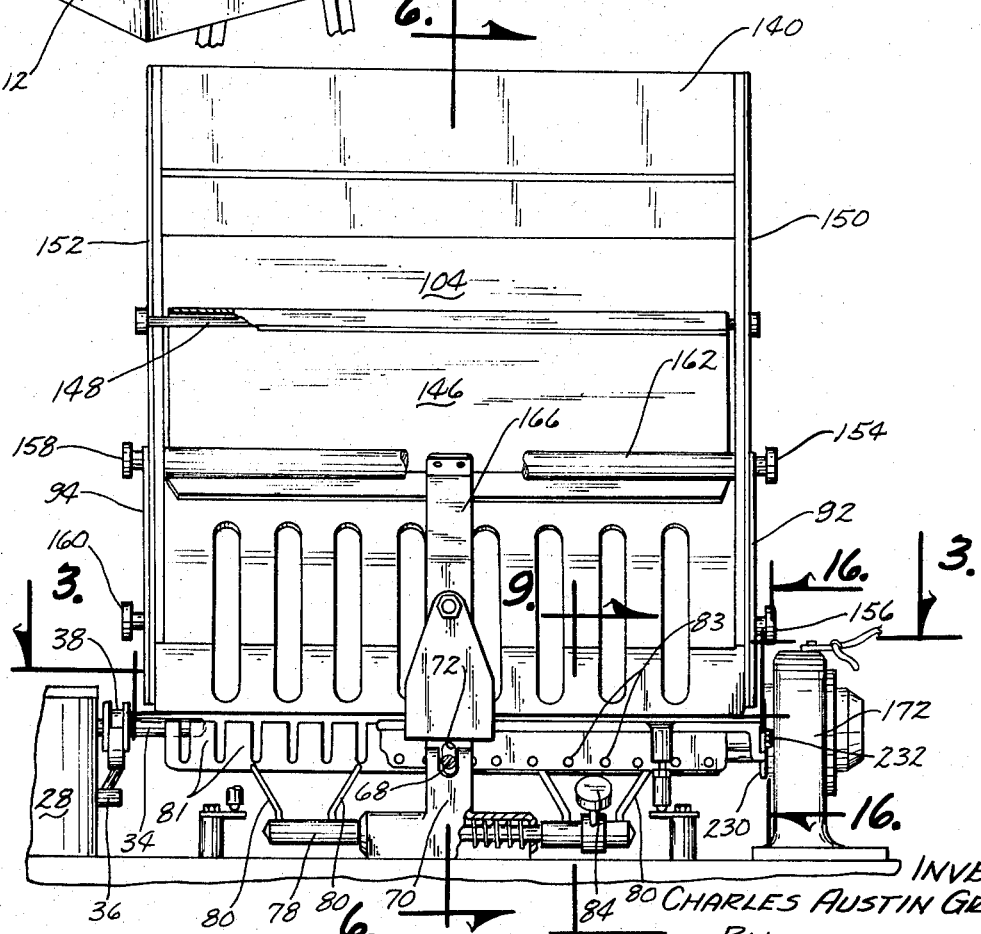
FIG. 2 is a fragmentary front plan view of the device with portions thereof cut away.

As viewed in FIG. 2, a casing chuck 172 is positioned to the right of the casing clamp and receives the end of the stuffer tube 34 in conventional fashion to facilitate the injection of meat into the casing. The end of the stuffer tube 34 is open to permit the meat mixture to be fed into the casing.

Referring now to FIGS. 11-15, the numeral 174 designates an actuating rod which is rotatably mounted in spaced apart supports 176 and 178. Rod 174 has a flat cam surface 180 provided on its one end which is engageable with the upper end of a pin 182 vertically movably extending downwardly through support 178 and top 24. The lower end of pin 182 is in engagement with a switch 184. It can be seen from FIG. 15 that rotation of rod 174 will cause cam surface 180 to push pin 182 downwardly to activate switch 184. Rod 174 is also provided with a flat top surface 186 extending between supports 176 and 178. Collar 188 is adjustably slidably mounted on rod 174 by means of thumbscrew 190 and has a cam arm 192 extending therefrom upon which is mounted a cam 194.

Block 196 is mounted on the left end of rod 174 (FIG. 11) and has a cam arm 198 extending upwardly and outwardly therefrom. Cam 200 is mounted on the upper end of cam arm 198 for engagement with a follower 202 which is longitudinally adjustably mounted on rod 36. Follower 202 is adapted to pivot the arm 198 to cause rod 186 to rotate and to move pin 182.

The numerals 204 and 206 refer to switches having actuator arms 208 and 210 extending therefrom. The numerals 212 and 214 designate actuator arms extending from switches 216 and 218 respectively. Stuffer tube 34 has a follower 220 mounted thereon which is adapted to engage and actuate switch actuator arms 208 and 212.

Figures 16, 17:
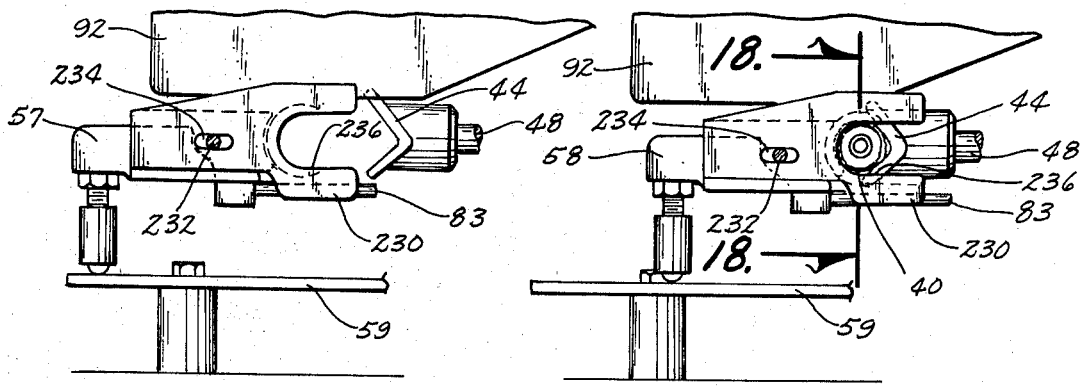
FIG. 16 is an enlarged sectional view seen along lines 16—16 of FIG. 2.
FIG. 17 is a view similar to FIG. 16 except that the casing clamp is illustrated in a closed position; and, FIG. 18 is an enlarged sectional view as seen along lines 18—18 of FIG. 17.
Figure 18:
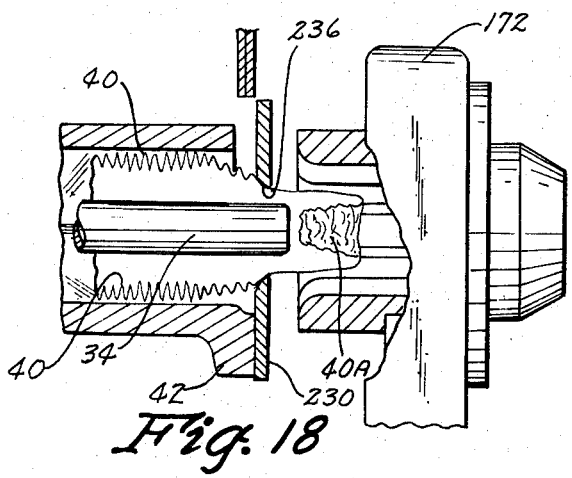

A "shear" plate 230 is selectively horizontally adjustably mounted on the end of front seat 42 for movement therewith. As seen in FIG. 18, plate 230 is positioned adjacent chuck 172. Screw 232 extends through slot 234 of plate 230 to effect the horizontal adjustment of the plate with respect to the seat 42. Plate 230 has a U-shaped slot formed therein as seen in FIG. 16. In operation, the plate 230 restrains the initial movement of the collagen casing into the chuck 172 since the slot 236 is somewhat smaller than the casing 40. Plate 230 insures that initially only knot 40A in casing 40 is dislodged into chuck 172. This prevents the knot from carrying a portion of the shirred casing into chuck 172 which would result in a faulty start or broken casing. Plate 230 then moves back away from chuck 172 as seat 42 opens. A different plate 230 would be used when different diameter casings are used.

The operation of the machine is as follows. If collagen casings are being used, the auxiliary hopper 138 will ordinarily not be used since the movement of the wall member 146 may cause damage to the same. If collagen casings are not being used, the auxiliary hopper 138 may be employed so that the wall member 146 will agitate the casings in the hopper with each cycle to prevent the casings from bridging or sticking therein. The back wall portion of the hopper 100 may be selectively adjusted as previously described to permit the accommodation of various casing sizes. The vertical positioning of the lower end of the hopper 100 may also be adjusted for various casing sizes by simply threadably moving adjustment screw 96 to raise or lower the hopper 100 with respect to the casing clamp. After the hopper has been properly adjusted, the hopper is filled with casings with a casing moving downwardly onto fingers 81 (FIG. 4) which prevent more than one casing from dropping from the hopper. When a casing 40 is positioned on casing 81 adjacent front seat 42, the casing engages the hook 76 on arm 68 to pivot the same downwardly as previously described. If a casing is not so positioned, the hook 76 prevents the subsequent movement of the seat 42 as also previously described.

Initially, the stuffer tube 34 and cam follower rod 36 are in the position illustrated in FIG. 12 with follower 220 engaging arm 210 and follower 202 engaging arm 208 and cam 200. The machine master switch (not shown) is actuated which causes front seat 42 to move the casing 40 from the position of FIG. 9 to the position of FIG. 10. The movement of back seat 44 is caused by its interconnection with front seat 42 as disclosed hereinbefore. The adjustment of elements 62 and 60 permit the seats 42 and 44 to be precisely adjusted with respect to the casing and stuffer tube so that the casing will be properly aligned. When front seat 42 has moved to its closed position, the bracket 54 actuates the switch 64 which causes the activation of the air cylinder which operates the stuffer tube 34. The stuffer tube 34 then moves to the right as viewed in FIG. 12 so that the stuffer tube is inserted into the casing as it is being held by the seats 42 and 44. When the stuffer tube 34 reaches its proper position with respect to the casing, the follower 220 engages arm 214 so that the air cylinder 50 is deactivated. The deactivation of air cylinder 50 permits spring 58 to move the seats 44 and 42 back to their open position. As seat 42 reaches its open position, bracket 54 engages switch 66 to actuate the air cylinder which operates the cam follower rod 36.

The actuation of the cam follower rod 36 causes the rod to move to the right as viewed in FIG. 12. As rod 36 moves to the right, the follower 202 disengages arm 208 and cam 200. The friction washer 209 yieldably maintains the shaft 174 in the position of FIG. 12 as follower 202 disengages from cam 200. As rod 36 moves to the right, the follower 38 moves along the tube 34 and engages the end of the casing (FIG. 8) to apply the proper compressive action thereon before the stuffing, linking and looping action commences which insures that the casing is properly compressed before it is rotated by the chuck 172. As rod 36 moves to the right, the adjustable follower 202 engages cam 194 which rotates shaft 186 thereby causing pin 182 to be depressed to actuate switch 184 which causes the activation of the meat pump, conveyor, linking assembly, looping assembly and chuck. The fact that follower 202 is selectively length adjustable on rod 36 insures the follower 202 can be adjusted so that the follower 38 will be moved into engagement with the casing before it is rotated. The longitudinal position of cam 194 with respect to shaft 106 may be selectively changed by simply loosening element 190 and sliding the cam on the shaft. The follower 38 on rod 36 continues to move along the tube 34 to engage the end of the casing 40 to maintain uniform pressure thereon as the casing is being filled so that the links will be uniform.

The follower 202 engages arm 212 when the casing 40 is substantially depleted. The engagement of the follower 202 with arm 212 deactivates the meat pump which will continue to coast momentarily. When the meat pump completely stops, the linking assembly, take-away conveyor and looping assembly are deactivated. When follower 202 engages arm 212, the follower rod 36 moves back to the left as viewed in FIG. 12. As rod 36 moves to the left, follower 202 engages cam 200 and moves the same upwardly which pivots shaft 186 clockwise to "recock" cam 194 to reset switch 184. It should be noted that when the follower 202 engaged cam 194 in its outward movement, the shaft 186 was rotated which caused cam 200 to be moved downwardly from the position of FIG. 11. After engaging cam 200 in its inward movement, the follower 202 then engages arm 208 which causes stuffer tube 34 to be moved to the left until follower 220 engages arm 210 which then permits the machine to recycle so that the casing clamp again operates if a casing 40 is positioned adjacent front seat 42.

Thus it can be seen that a product encasing machine has been disclosed which permits the machine to handle casings in an extremely sensitive manner without damaging the same to insure that a uniform product will be provided. It can also be seen that a product encasing machine has been provided which has the necessary adjustment means thereon to accommodate the various casing sizes. The sequential operation of the stuffer tube, cam follower rod and shaft 186 is such that proper compression is applied to the casing before it is rotated and so that uniform pressure will be exerted on the casing during the filling of the same. Further, the sequential operation of the stuffer tube 34, rod 36 and shaft 186 and the switch elements and cam members associated therewith is such that damage to the machine is prevented if a troublesome situation arises.

Thus it can be seen that the machine of this invention accomplishes at least all of its stated objectives.

I claim:

1. A product encasing machine, comprising,
   a hopper for folded casings, said hopper including a removable auxiliary hopper thereon;
   a stuffer tube adapted to be positioned in said folded casings;
   clamp means for said casings as they are received from said hopper;
   means for closing said clamp means to position one of said casings therein for reception of said stuffer tube therein;
   means for moving said stuffer tube into said one casing;
   means responsive to movement of said stuffer tube into a predetermined position in said one casing for opening said clamp means;
   a casing follower movable along said stuffer tube and adapted to engage one end of said one casing and exert a predetermined force thereon;
   means responsive to the opening of said clamp means for moving said casing follower into contact with said one casing;
   means for forcing the product through said stuffer tube and into said one casing; and
   means for linking the encased product;
   said auxiliary hopper including a casing agitator means pivotally secured thereto, said agitator means being operatively connected to said clamp means whereby said agitator means pivots into said auxiliary hopper to agitate the casings thereon with each cycle of said clamp means.

2. A product encasing machine comprising a hopper for folded casings;
   a stuffer tube adapted to be positioned in said folded casings;
   clamp means for said casings as they are received from said hopper;
   means for closing said clamp means to position one of said casings therein for reception of said stuffer tube therein;
   means for moving said stuffer tube into said one casing;
   means responsive to movement of said stuffer tube into a predetermined position in said one casing for opening said clamp means;
   a casing follower movable along said stuffer tube and adapted to engage one end of said one casing and exert a predetermined force thereon;
   means responsive to the opening of said clamp means for moving said casing follower into contact with said one casing;
   means for forcing the product through said stuffer tube and into said one casing;
   said hopper having a throat portion normally positioned above said clamp means adapted to supply casings to said clamp means;
   a hopper support means;

a support arm means secured at one end to said hopper and extending rearwardly and downwardly therefrom, said support arm means being pivotally connected at its other end to said hopper support means to permit said hopper to be pivotally raised upwardly and rearwardly from said clamp means.

3. The machine of claim 2 wherein an adjustment screw means is threadably secured to said support arm means and engages said hopper support means to permit the selective vertical adjustment of said throat portion with respect to said clamp means.

4. A product encasing machine comprising:
a hopper for casings;
a stuffer tube adapted to be positioned in a folded casing;
clamp means for clamping said casings as they are received from said hopper;
means for closing said clamp means to position one of said casings therein for reception of said stuffer tube therein;
means for moving said stuffer tube into said one casing;
a casing follower movable along said stuffer tube to a predetermined position wherein said casing follower exerts a predetermined force on one end of said one casing;
forcing means for forcing product through said stuffer tube and into said casing;
first means responsive to movement of said stuffer tube into a predetermined position within said casing for opening said clamp means;
second means responsive to the opening of said clamp means for moving said casing follower into contact with said casing; and
third means responsive to movement of said casing follower to said predetermined position on said stuffing tube for actuating said forcing means whereby said forcing means will be actuated after said casing follower exerts said predetermined force on said one casing.

5. The machine of claim 4 wherein said hopper includes a throat portion positioned above said clamp means and means for adjusting the size of said throat portion to accommodate various casing sizes.

6. The machine of claim 4 wherein said hopper includes a lower discharge end positioned above said clamp means, said hopper means being vertically adjustable to permit its lower discharge end to be raised and lowered with respect to said clamp means.

7. The machine of claim 4 wherein a pivotal arm means extends through said clamp means and is weight responsive to a casing in said clamp means, and means on said pivotal arm means adapted to engage said clamp means to prevent its closing unless a casing is positioned therein and on said pivotal arm means.

8. The machine of claim 4 wherein said hopper comprises front and back wall portions secured to and extending between opposite side wall portions, said front and back wall portions having spaced apart lower end portions defining a throat portion normally positioned above said clamp means adapted to supply casings to said clamp means.

9. The machine of claim 8 wherein said back wall portion of said hopper is horizontally adjustably secured to said side wall portions to permit the adjustment of the size of said throat portion to accommodate various casing sizes.

10. The machine of claim 4 wherein said clamp means comprises a horizontally disposed V-shaped front seat portion and a horizontally disposed V-shaped back seat portion which are movable towards each other to close upon a casing, and adjustment means on at least one of said seat portions for vertically adjusting the seat portion with respect to the other seat portion and with respect to the hopper and stuffer tube, and adjustment means on at least one of the seat portions for adjusting the amount of horizontal travel of the seat portion.

11. The machine of claim 4 wherein said clamp means comprises a horizontally disposed V-shaped front seat portion and a horizontally disposed V-shaped back seat portion which are movable towards each other to close upon a casing, and means on one end of said front seat portion for retarding the movement of the casing therethrough.

12. The machine of claim 11 wherein said means on one end of said front seat portion comprises a shear plate means adjustably mounted thereon and having a U-shaped slot provided thereon which receives the casing therein, said slot having a width less than the diameter of the casing.

13. A product encasing machine according to claim 4 comprising a rotatable chuck adapted to receive said casing after said casing is stuffed; power means for rotating said chuck; said third means being responsive to movement of said casing follower to said predetermined position on said stuffing tube for actuating said power means whereby said chuck will begin rotating after said casing follower exerts said predetermined force on said one casing.

14. A product encasing machine according to claim 4 comprising a chuck adapted to receive said one casing therein; said stuffing tube being movable to insert a portion of said one casing into said chuck; retarding means adjacent said chuck for engaging said one casing and retarding movement of said one casing toward said chuck before said stuffing tube inserts said one casing into said chuck.

15. A product encasing machine according to claim 14 wherein said retarding means includes a plate having an opening therein which receives said casing, said opening having a width less than the diameter of said casing.

16. A product encasing machine,
a support,
a hopper for casings on said support,
clamp means for the casings as they are received from said hopper, said clamp means being normally open,
a stuffer tube horizontally movably mounted on said support and being movable from a first position to a second position wherein said tube is positioned in a folded casing,
a switch actuator on said stuffer tube,
first power means moving said stuffer tube between its first and second positions,
second power means for closing said clamp means to position the casing therein for reception of said stuffer tube therein,
a pump means for forcing the product through said stuffer tube and into said casing,
linking means for linking the encased product,
a first switch means on said support adapted to be actuated by said switch actuator when said stuffer tube is moved from its second position to its first position,
a casing follower rod horizontally movably mounted on said support adjacent said stuffer tube and being movable between first and second positions,
third power means for moving said follower rod,
a casing follower on said follower rod movable along said stuffer tube and adapted to engage one end of the casing and exert a predetermined force thereon,
a second follower on said follower rod,
a second switch means on said support adapted to be actuated by said second follower when said follower rod is moved from its second position to its first position,
a third switch means on said support adapted to be actuated by said second follower when said follower rod is moved to its second position,
a fourth switch means on said support adapted to be actuated by said switch actuator on said stuffer tube when said stuffer tube is moved to its second position,
a horizontally disposed actuator rod rotatably mounted on said support adjacent said follower rod and being rotatable between first and second positions,
a first cam arm means on one end of said actuator rod,
said second follower on said follower rod adapted to engage said first cam arm means to move said actuator rod to its first position when said follower rod is moved to its first position,
a second cam arm means on said actuator rod intermediate the ends thereof adapted to be engaged by said second follower to move said actuator rod to its second position as said follower rod is moved to its second position, a fifth switch means on said support, said actuator rod actuating said fifth switch means when said actuator rod is moved to its first and second positions, a sixth switch means on said support operatively connected to said first power means and being responsive to said clamp means being closed upon a casing to actuate said first power means to cause said stuffer tube to move from its first position towards its second position, said fourth switch means being operatively connected to said first power means and adapted to deactivate said first power means when said stuffer tube reaches its second position, said fourth switch means being operatively connected to said second power means and adapted to deactivate said second power means upon said switch actuator on said stuffer tube actuating said fourth switch means, a sixth switch means on said support responsive to the opening of said clamp means and being operatively connected to said third power means to cause said follower rod to move from its first position towards its second position, said fifth switch means being operatively connected to and adapted to actuate said pump means and said linking means upon said second follower engaging said second cam arm means as said follower rod is moved towards its second position, said third switch means being operatively connected to and adapted to deactivate said pump means and linking means upon said follower rod reaching its said second position, said third switch means also being operatively connected to said third power means to cause said third power means to move said follower rod from its second position to its first position upon said second follower engaging said third switch means, said second follower engaging said first cam arm means to deactivate said fifth switch means as said follower rod is moved to its said first position, said second switch means being operatively connected to said first power means to cause said first power means to return said stuffer tube from its second position to its first position upon said second follower engaging said second switch means as said follower rod is moved to its first position, the movement of said stuffer tube from its second position to its first position causing said switch actuator to engage said first switch means to permit the machine to re-cycle.

17. The machine of claim 16 wherein said second cam arm means is longitudinally adjustably mounted on said actuator rod.

18. The machine of claim 16 wherein said actuator rod includes means for yieldably maintaining said actuator rod in its first and second positions.

19. The machine of claim 16 wherein conveyor means and looping means are mounted on the machine, said fifth switch means being operatively connected to and adapted to actuate said conveyor means and looping means upon said second follower engaging said second cam arm means as said follower rod is moved towards its second position, said third switch means being operatively connected to and adapted to deactivate said conveyor means and looping means upon said follower rod reaching its second position.

* * * * *